(No Model.) 2 Sheets—Sheet 2.
D. W. CUMMINS.
APPARATUS FOR TEMPERING CLAY.
No. 548,521. Patented Oct. 22, 1895.
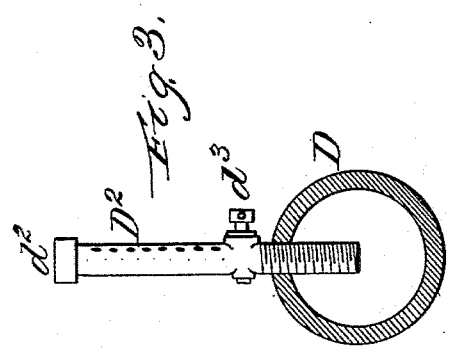
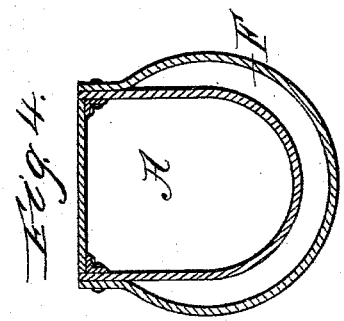
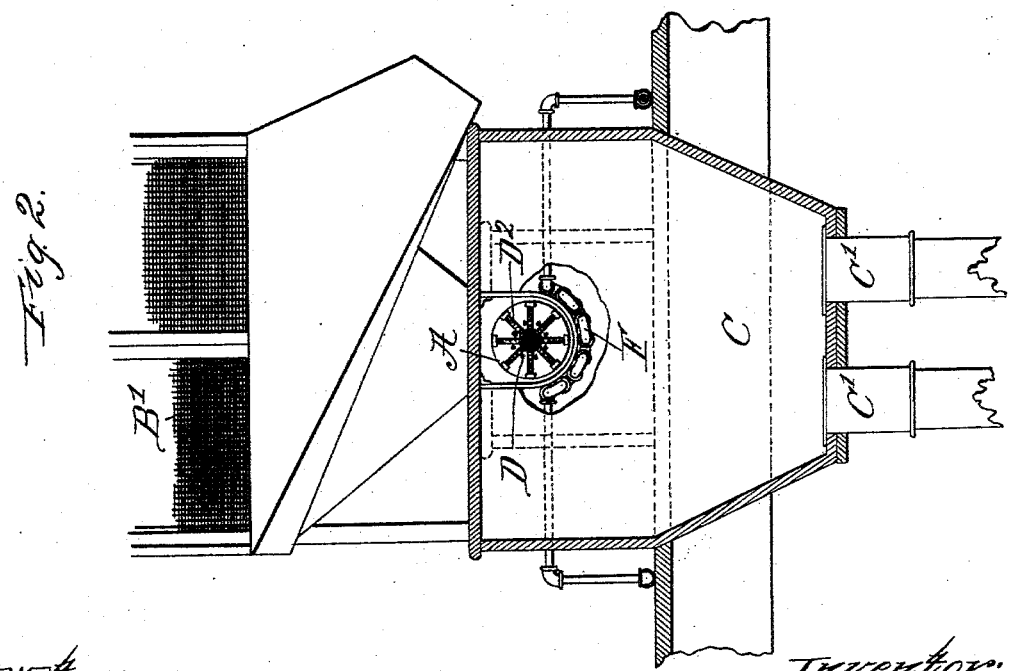

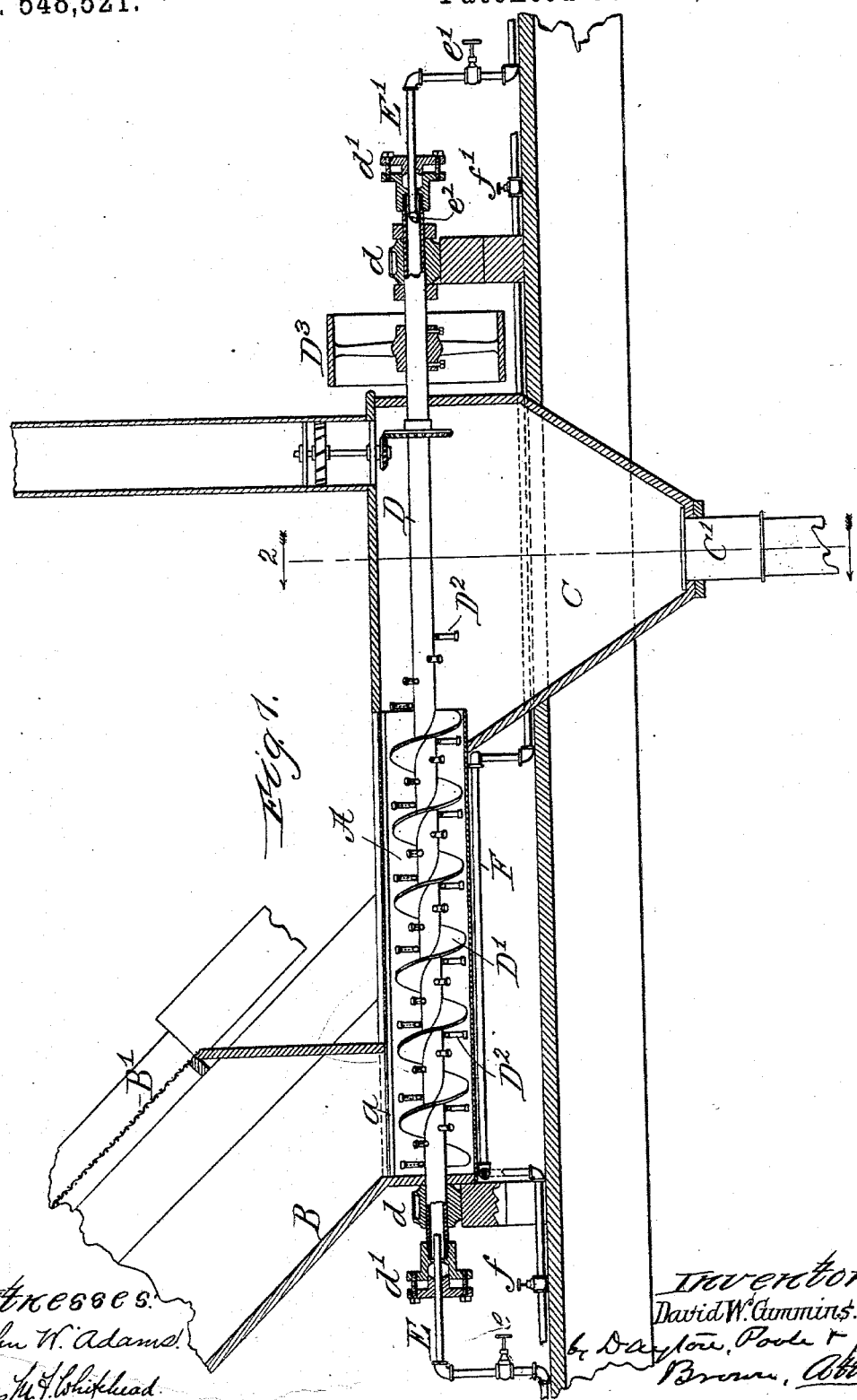

UNITED STATES PATENT OFFICE.

DAVID W. CUMMINS, OF CHICAGO, ILLINOIS.

APPARATUS FOR TEMPERING CLAY.

SPECIFICATION forming part of Letters Patent No. 548,521, dated October 22, 1895.

Application filed March 16, 1893. Serial No. 466,231. (No model.)

*To all whom it may concern:*

Be it known that I, DAVID W. CUMMINS, of Chicago, in the county of Cook and State of Illinois, have invented certain new and useful Improvements in Apparatus for Tempering Clay; and I do hereby declare that the following is a full, clear, and exact description thereof, reference being had to the accompanying drawings, and to the letters of reference marked thereon, which form a part of this specification.

This invention relates to improvements in apparatus for tempering clay for use in the manufacture of bricks; and it consists in the matters hereinafter set forth, and particularly pointed out in the appended claims.

In the accompanying drawings, illustrative of a machine embodying my invention in one form, Figure 1 is a longitudinal section of the machine in the axis of the worm-shaft, part of which shaft, together with the worm and other attachments, is shown in side elevation. Fig. 2 is a vertical section in the line 2 2 of Fig. 1, a portion of the wall of the discharge-hopper being removed to show one form of the heating means applied to the tempering-chamber. Fig. 3 is a transverse section of the worm-shaft enlarged, and Fig. 4 is a transverse section of a modified form of the tempering-chamber.

A represents a horizontal mixing or tempering chamber of metal having a semicylindrical bottom, as indicated in Figs. 2 and 4. Over the receiving ends of said tempering-chamber will usually be placed an inclined chute B, having an inclined screen B' above it. The clay, after being ground or otherwise pulverized, will be thrown upon the screen B', and, falling upon the inclined bottom of the chute, will pass through the opening $a$ into the receiving end of the tempering-chamber A.

C is a hopper placed at the delivery end of the tempering-chamber A to receive the tempered clay and to discharge it through one or more spouts C' C', which proceed from the hopper-bottom.

D is a hollow rotative shaft situated in the axis of the tempering-chamber A and supported in suitable bearings $d\ d$. It is provided at its extremities with stuffing-boxes $d'\ d'$, through which respectively pass the non-rotating pipes E E' for the induction of steam and the escape of water. The shaft D carries a worm-flange D' or its equivalent for moving the clay in the chamber A from its receiving to its discharging end when said shaft is rotated.

$D^2\ D^2$ are a series of radial pipes tapped into the hollow shaft D, as best shown in Fig. 3, said pipes extending inwardly beyond the inner surface of the tube D, and preferably to the center thereof, as also illustrated in said Fig. 3. The outer extremities of these pipes $D^2$ are closed—as, for example, by caps $d^2$—and said pipes are provided with perforations for the emission of steam. As a special improvement, said radial pipes $D^2$ are further shown as provided with valves $d^3$ between perforations of said pipes and the outer surface of the tubular shaft D, whereby the quantity of steam allowed to pass from the tube D through the perforations of the radial pipes may be varied at pleasure. The perforations in the said radial pipes $D^2$ may advantageously be limited to the rear sides of said pipes to prevent the admission of clay in their revolution.

F is a heating device external to the tempering-chamber A, said heating device being shown in Figs. 1 and 2 as consisting of a series of return-bend steam-pipes arranged lengthwise beneath and at the sides of the tempering-chamber with suitable outlet and inlet connections.

In Fig. 4 the heating device F is shown as a continuous steam-jacket, embracing the lower portion and sides of the tempering-chamber and also to be provided with suitable inlet and outlet connections.

The hollow worm-shaft D is provided with a suitable driving-pulley $D^3$, by which it may be rotated, and the various steam-pipes are provided with suitable valves, as $e\ e'$ and $f f'$.

In the operation of the machine upon clay requiring to be moistened or tempered steam is admitted to the hollow shaft D through the supply-pipe E and passes outwardly into the clay through the perforated radial pipes $D^2$. If the valves $d^3$ be employed, the quantity of steam discharged into the clay may be regulated by said valves, and, if desired, said valves may be so variously set as to deliver more or less steam into different parts of the tempering-chamber or of the clay being mixed therein. If the valves $d^3$ are omitted, reasonably satisfactory control of the steam-supply may be effected through the valve $e$ in the steam-inlet pipe E. The pipe E' takes the water of condensation formed within the shaft D and its radial connections and discharges it under the control of the valve $e'$. By reason of the inward extension of the radial perforated pipes $D^2$ beyond the inner surface of the tubular shaft D the water of condensation is prevented from passing outwardly through said perforated pipes, and only steam is discharged therefrom. If the worm-shaft is to be horizontal, or very nearly so, the discharge of water therefrom through a concentric discharge-pipe E' will be best effected by providing an inlet-opening to said discharge-pipe as close as practicable to the bottom of the worm-shaft—as, for example, by an elbow applied to the end of said discharge-pipe, as indicated at $e^2$ in Fig. 1. To plug the pipe E' and to provide a hole through its under side will be the equivalent of the elbow. The said radial pipes serve to stir the clay in the rotation of the shaft D and therefore to distribute the steam throughout the mass very evenly. The worm D', either in the form shown or in any other suitable form, will feed the material along as it is mixed or stirred from the receiving end to the discharge end of the tempering-chamber A, so that the operation may be continuous. If it is desired to heat the clay additionally, steam is passed through the heating pipes or chamber F, or if it be desired to heat the clay without at the same time injecting steam into it, or if it be desired to dry clay which is already too moist the heating device F may be used and the steam may be cut off from the hollow worm-shaft D or from the perforated pipes $D^2$ only.

I do not wish to be restricted to the precise form and arrangement of the parts or to the details of construction shown in the drawings and above described, since various changes in these particulars may be made without departure from my invention. I also wish it to be understood that I may employ a part of the improvements herein set forth without others.

I claim as my invention—

1. The combination with a tempering chamber, of a rotary hollow shaft extending longitudinally of said chamber and provided with a worm conveyer flange, steam connections for said shaft and perforated radial tubes located along the shaft between the convolutions of the conveyer flange, substantially as described.

2. The combination with a tempering chamber, of a rotary hollow worm shaft, extending longitudinally of said chamber, steam connections for said shaft, perforated radial tubes located along said shaft between the convolutions of the conveyer flange, and an exterior heating device for said chamber, substantially as described.

3. The combination with a substantially horizontal tempering chamber, of a horizontally arranged, rotary hollow shaft extending longitudinally of the chamber and provided with steam connections, and radial perforated tubes located along said shaft, the inner ends of said tubes extending into the shaft beyond the interior surface thereof, whereby water of condensation accumulating in the shaft is prevented from entering the tubes, substantially as described.

4. The combination with a substantially horizontal tempering chamber, of a rotary hollow worm shaft extending longitudinally thereof, perforations for the escape of steam along said shaft, an inlet pipe connection at one end of the shaft, and a non-rotative outlet pipe extending into the other end of the shaft through a closely fitting opening and provided with a water inlet within the shaft and adjacent to the lower surface thereof, substantially as described.

5. The combination of the substantially horizontal tempering chamber A, hollow worm shaft D extending within the tempering chamber, radial, perforated pipes $D^2$ connected with the worm shaft, worm D' thereon, stuffing boxes $d'$ $d'$ at the ends of the worm shaft, valved inlet and outlet pipes E E' communicating with the hollow worm shaft, chute B leading to the tempering chamber, and discharge hopper C, substantially as described.

In testimony that I claim the foregoing as my invention I affix my signature in presence of two witnesses.

DAVID W. CUMMINS.

Witnesses:
M. E. DAYTON,
ALBERT H. GRAVES.